Figure 1:
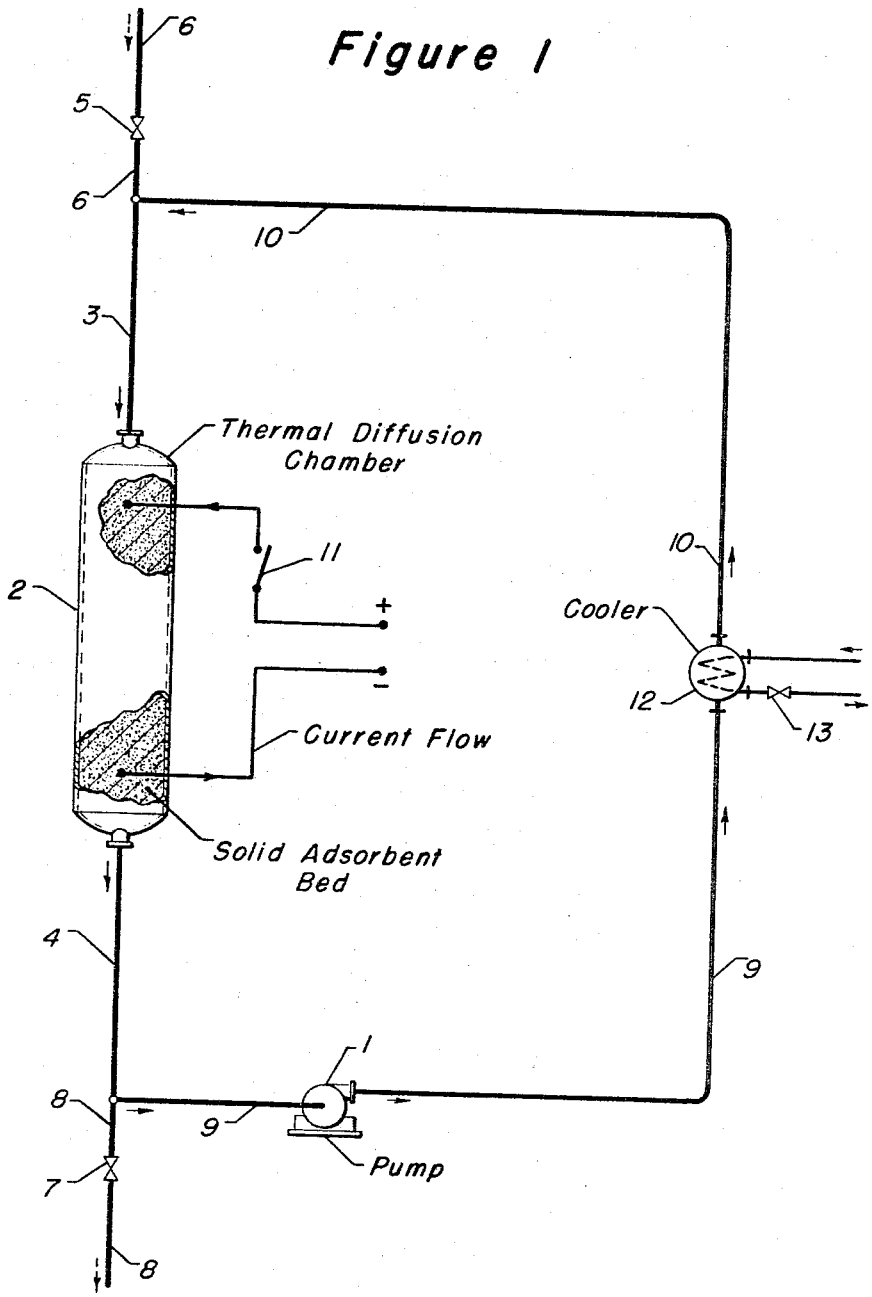

INVENTOR:
Donald B. Broughton
BY: James R. Hoatson Jr.
William H. Page II
ATTORNEYS

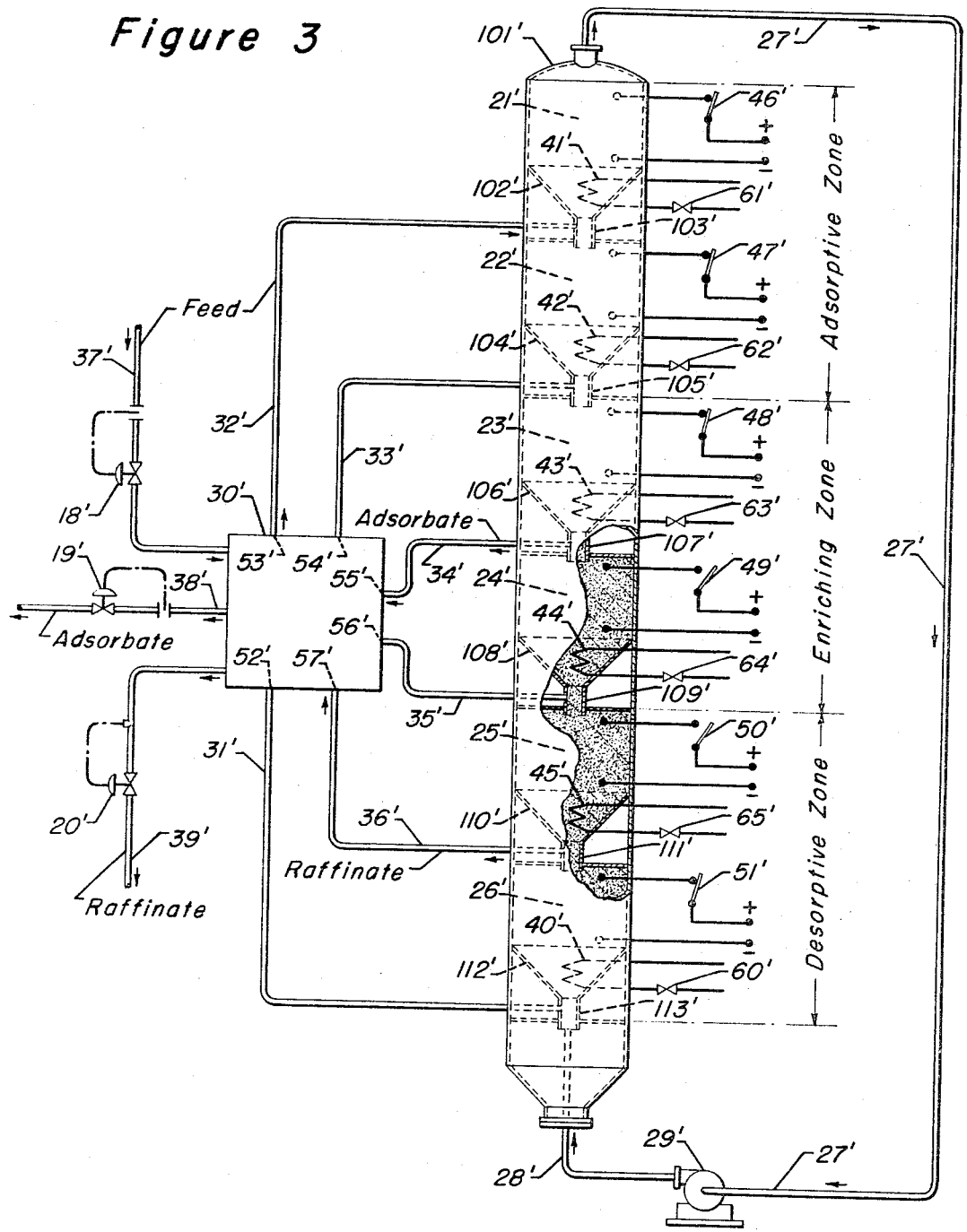

United States Patent Office 3,313,722
Patented Apr. 11, 1967

3,313,722
CONTINUOUS THERMAL DIFFUSION PROCESS EMPLOYING FIXED BEDS OF ADSORBENT AND MOVING INLETS AND OUTLETS
Donald B. Broughton, Evanston, Ill., assignor to Universal Oil Products Company, Des Plaines, Ill., a corporation of Delaware
Filed Mar. 4, 1964, Ser. No. 349,240
16 Claims. (Cl. 208—310)

This invention relates to a thermal diffusion process for the separation of components of a fluid mixture. More particularly, this invention relates to a process which comprises introducing a fluid mixture at a given temperature into contact with a solid adsorbent at a different temperature, said adsorbent being substantially non-selective for any component of said mixture when both the mixture and the adsorbent are in contact at substantially the same temperature, thereby retaining an adsorbate having a higher concentration of at least one component of said mixture on the adsorbent, separately withdrawing from the adsorbent non-adsorbed raffinate of lower concentration of adsorbed component while maintaining said given and different temperatures, adjusting the temperature of the adsorbent and its surrounding fluid mixture to substantially the same temperature and withdrawing from the adsorbent resulting adsorbate having a higher concentration of adsorbed component.

More specifically, this invention relates to a thermal diffusion process for the separation of components of a fluid mixture employing a series of serially interconnected fixed beds which process comprises contacting a fluid mixture at a given temperature under conditions of simulated countercurrent flow with a fixed bed of solid adsorbent at a different temperature than said fluid mixture, substantially simultaneously withdrawing non-adsorbed reaffinate from a downstream bed outlet, adjusting the temperature of a downstream fixed bed of solid adsorbent to a temperature substantially the same as the surrounding fluid, and withdrawing resulting adsorbate from the process at an outlet further downstream, the point of introduction of the feed stock into the process flow and the points of withdrawal of reaffinate and adsorbate constantly shifting in equal increments downstream to provide a continuous simulated countercurrent flow of the inlet and outlet streams in relation to the fixed beds of solid adsorbent.

Still more specifically, this invention relates to a continuous thermal diffusion process for adsorptive separation of components of a liquid mixture, which process comprises the steps: introducing a liquid mixture of components into one zone of a series of serially interconnected fixed beds of solid adsorbent which is substantially non-selective for any component of said mixture when both the mixture and the adsorbent are in contact at substantially the same temperature, said series containing at least three serially interconnected zones having fluid flow connecting means between adjacent zones and between the outlet of the last zone and the inlet of the first zone to thereby provide cyclic fluid flow in said process, introducing said liquid mixture into the furthest downstream outlet of an enriching zone and maintaining the temperature of the adsorbent relatively higher than the circulating fluid in said enriching zone, substantially simultaneously withdrawing a non-adsorbed liquid reaffinate from the furthest downstream outlet of an adsorption zone of said series of fixed beds while maintaining the adsorbent temperature relatively higher than the circulating fluid, substantially simultaneously withdrawing adsorbate from the downstream outlet of a desorption zone of said series of fixed beds while maintaining the temperature of the adsorbent and the circulating fluid substantially the same, maintaining a continuous circulating stream of fluid flowing through said series of interconnected zones and achieving countercurrent flow by periodically advancing downstream the point of introducing liquid mixture, simultaneously and equally advancing downstream the point of withdrawing said raffinate and said adsorbate while simultaneously and equally advancing downstream the zones of maintaining the adsorbent temperature relatively higher than the circulating liquid and simultaneously and equally advancing downstream the zone of maintaining the adsorbent temperature substantially the same as the circulating liquid.

The separation of fluids by thermal diffusion has been known for many years. Numerous apparatus have been proposed to apply the concept of thermal diffusion to achieve separation of fluids. All these apparatus consist essentially of a means for confining a fluid in a narrow chamber and imposing a temperature gradient across said narrow chamber. One example of a separation apparatus is when the chamber is formed by two parallel plates with a narrow clearance between said parallel plates one of which plates is relatively heated and the other of which is relatively cooled. Another example of a separation apparatus is when the chamber is formed by concentric tubes wherein the inner surface of the outer tube and the outer surface of the inner tube form an annular chamber across which a temperature gradient is imposed, one of which tubes is relatively heated and the other of which is relatively cooled. In these and other conventional thermal diffusion apparatus the fluid feed stock is introduced between the relatively hot surface and the relatively cold surfaces. Convective circulating action results in a circulating flow of fluid up the hot surface and down the cold surface. Thermal diffusion effects cause certain components of the fluid to diffuse toward the hot surface and other certain components to diffuse toward the cold surface. The diffusive flow is superimposed on the convective flow with the net result being that the fluid at the top of the chamber becomes enriched in those components that diffuse toward the hot surface and the fluid at the bottom of the chamber becomes enriched in those components that diffuse toward the cold surface. In order to achieve economical separation, the clearance between the relatively hot surface and the relatively cold surface should be in the order of 0.05". In order to apply this type of apparatus to a large scale operation, a large number of such relatively hot and relatively cold surfaces at narrow spacings must be provided. Both the large required surface area and the necessity for precise control of spacing between the relatively hot and the relatively cold surfaces result in high capital costs.

The basic principle of the present invention is to achieve separation of fluids by thermal diffusion wherein the fluid feed stock is contacted with a porous solid adsorbent, maintained at a higher temperature than said feed stock, resulting in the components of the fluid which tend to diffuse to the hot surface concentrating in the intraparticle pores of the solid and the other components concentrating in the interparticle void space. This concentration difference will be maintained only as long as a temperature difference is maintained between said solid adsorbent and the fluid which is circulating through said solid adsorbent. This principle may be further illustrated by referring to FIGURE 1. In FIGURE 1 a thermal diffusion chamber 2 is filled with a porous granular solid adsorbent which has substantially no adsorptive selectivity for any components of the fluid feed stock which is to be processed in the thermal diffusion chamber, but said solid adsorbent has an appreciable degree of electrical conductivity. Examples of the solid adsorbent which are included to illustrate but not intended to limit would be 10–200 mesh granules of a porous graphite or of any porous metal. An electric current is passed continuously through the bed of said solid adsorbent which results in the development of heat within said solid adsorbent which in turn causes the temperature of said solid adsorbent to be maintained higher than that of the circulating fluid. The feed stock is introduced into the system through line 6. The fluid feed stock is passed continuously through the bed of said hot solid adsorbent, circulated through cooler 12 to extract the heat absorbed from said hot solid adsorbent and is then recirculated back to said bed of hot solid adsorbent. As is shown in FIGURE 1, relatively cold fluid enters chamber 2 through line 3 and comes into contact with said hot solid adsorbent. Valves 5 and 7 remain closed during this recirculating period. The relatively hot fluid is withdrawn out of chamber 2 through line 4 then into line 9 through pump 1 and through cooler 12. The relatively cold fluid is then returned to chamber 2 by flowing through line 10 and into line 3. With this arrangement a temperature difference is maintained between the solid adsorbent and the circulating fluid. Consequently, the components of the fluid which tend to diffuse toward the hot surface will concentrate in the intraparticle pores of said solid adsorbent and the other components will concentrate in the interparticle voids. This concentration difference will be maintained as long as a temperature difference between said solid adsorbent and said circulating fluid is maintained. When the system as shown in FIGURE 1 has come to equilibrium, that is, there is no further change in concentration in either the fluid in the intraparticle pores or in the fluid in the interparticle voids, then a portion of the fluid called the raffinate is withdrawn through line 8 by opening valve 7, said raffinate being depleted in concentration of those components in the fluid feed stock which tend to diffuse toward the hot surface. Valve 7 is then closed and the electric current is discontinued by opening switch 11 and the cooler is made inoperative by closing valve 13. The residual liquid called the adsorbate left in the system is continually recirculated until the solid adsorbent and the circulating adsorbate reach substantially the same temperature. Since the said solid adsorbent is no longer selective for any of the components in the original feed stock, the previously selectively adsorbed components will diffuse back into the circulating fluid. When this system has come to equilibrium, the adsorbate is withdrawn and said adsorbate will be found to be enriched in concentration in those components in the original feed stock which tend to diffuse toward the hot surface. Thus, a partial separation has been effected and if this operation is properly multistaged, complete separation of these components is achieved in a continuous process. One of the embodiments of this invention, which is hereinafter described, is the application of the above described thermal diffusion principle to a continuous multistage process to achieve separation of the components of a fluid feed stock. In this system the area across which diffusive transfer occurs is essentially the total surface area of the solid adsorbent in the bed. Large areas can easily be obtained in packed beds of moderate dimensions in contrast to the conventional thermal diffusion apparatus thus achieving substantial savings in equipment capital costs. Also, equilibrium is achieved more rapidly in this system than in the conventional apparatus since the length of path along which diffusive transfer must take place is only about one-half of one particle diameter whereas in the conventional apparatus the analogous distance is the spacing between the surfaces and this spacing distance cannot be made too small because of mechanical difficulties in fabrication of surfaces of large area spaced uniformly at small uniform clearances.

Figure 2:
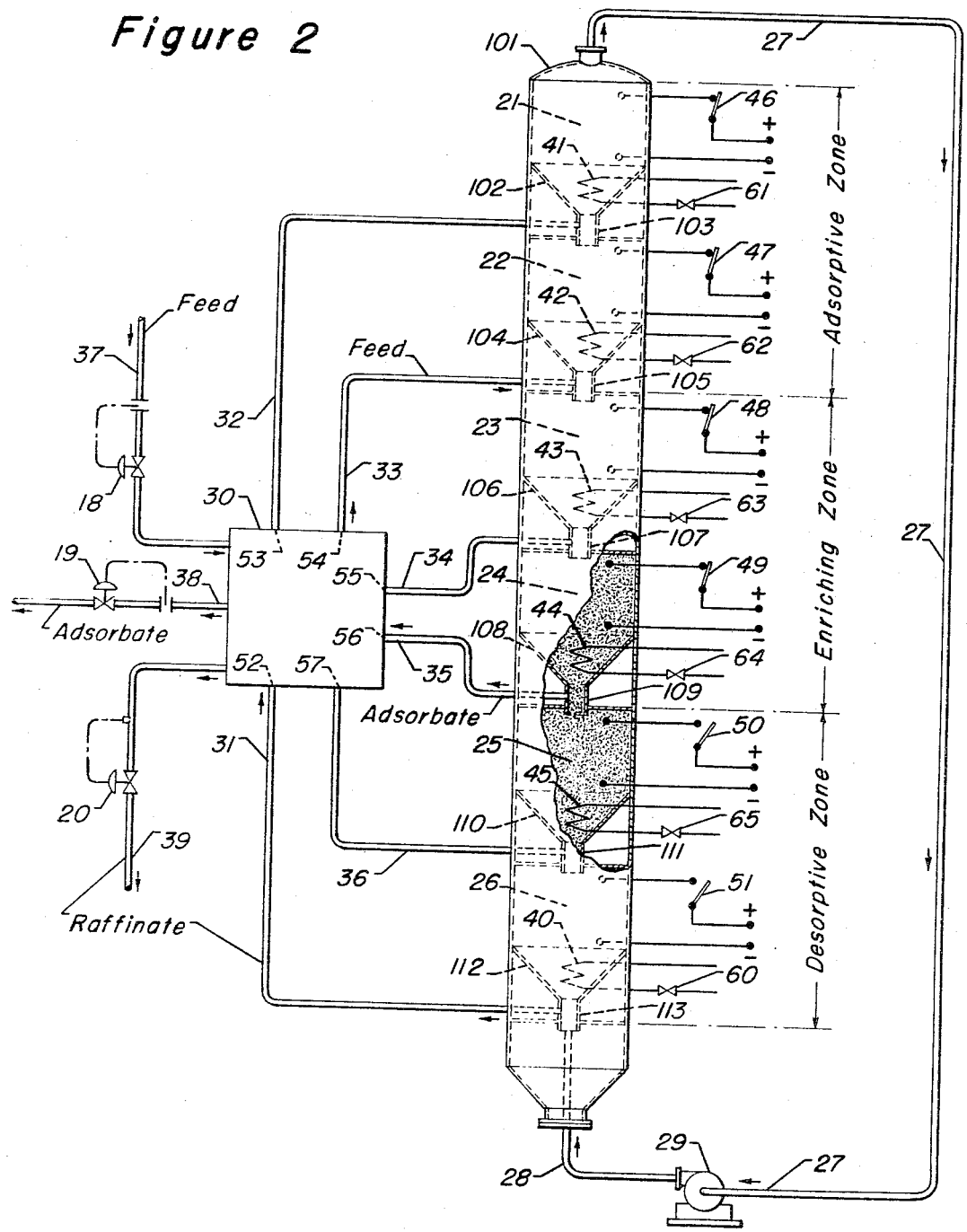

The application of the invention to a continuous process is more specifically described with reference to FIGURE 2 which is a simplified form of a column and a control valve for carrying out the process. Any suitable apparatus comprising a series of fixed beds or one single apparatus comprising a series of fixed beds or one single continuous bed of adsorbent, if desired, having fluid flow connecting means between the outlet of one bed and the inlet of its next adjacent bed and comprising a suitable means such as a valve or manifold, for shifting the points of inlet and outlet for the various feed and product streams involved in the process may be provided. The accompanying diagram illustrates one of the preferred apparatus designs, being particularly suitable because of its compact arrangement of the series of fixed beds in adjacent relationship to each other. The series of fixed beds may be a number (at least 3) of horizontally spaced, separate beds interconnected by a pipe between the bottom of one bed to the top of its upstream adjacent bed, or the beds may be stacked one upon another within a suitable vertical column as illustrated in FIGURE 2 of the accompanying diagram herein referred to in its entirety as contacting column 101 containing suitably shaped partitioning means which divide the vertical column into a series of adjacent contacting beds such as beds 21 to 26, each bed being divided from its adjacent contacting beds (except the uppermost and lowermost zones) by a funnel-shaped partitioning member which contains a heat exchange coil and also contains no solid adsorbent such as partition 102 located between beds 21 and 22 with heat exchange coil 41 therein having a downcomer 103 of restricted sectional area opening into subadjacent contacting bed 22.

An essential portion of the present apparatus essential, that is, to the realization of the type of flow provided by the present method of operation, is the provision of a suitable programming device for changing the points of inlet and outlet into and from the contacting column, for advancing each of these in equal increments and in a downstream direction and also for advancing the point at which electric current is flowing through the adsorbent bed and the point at which the heat exchange coils are operative in equal increments and in a downstream direction during the operation of the process. Any suitable form of fluid distribution center such as a manifold arrangement of valves and incoming and outgoing lines may be provided with timed, electrically operated switches to open and close the appropriate valves and to start and stop the flow of current into the appropriate beds. The programming principle may also be suitably effected by means of a plug valve of particular design such as that rotary valve described and claimed in U.S. Patent 3,040,777, issued June 26, 1962. The movement of the valve is synchronized with the opening and closing of electrical switches which controls the flow of electric current in the appropriate beds and controls the opening and closing of valves which maintain the flow of cooling fluid through the appropriate heat exchange coils.

Valve 30, representing a suitable programming device, contains a number of fluid inlet and outlet ports, 52 to 57, which are connected to the contacting beds in column 101 by process flow conduits 31 to 36. As shown in FIGURE 2, the feed stock is introduced through flow conduit 37, through valve 30 which is positioned to send the feed stock through port 54 and flow conduit 33 into downcomer 105 through the funnel-shaped partitioning member 104 and finally into bed 22. The rate of introduction of feed stock through flow conduit 37 is controlled by suitable flow control, for example, employing an orifice in flow conduit 37 causing a pressure drop across said orifice and suitable detection equipment to detect the pressure drop, compare said pressure drop to a set required pressure drop and having the error signal actuate control valve 18, thus achieving flow control. The adsorbate is withdrawn from downcomer 109 through flow conduit 35 into port 56 and out flow conduit 38 under the flow control of valve 19 as described above. The raffinate is withdrawn from downcomer 113 through flow conduit 31 into port 52 through the rotary valve and out flow conduit 39. The rate of withdrawal of raffinate through flow conduit 39 is controlled by a suitable pressure control device such as an instrument which senses the pressure in column 101 and actuates control valve 20 to maintain a constant set pressure. A continuous stream of fluid is circulated from the column through flow conduit 27 through pump 29 and back into the column through flow conduit 28, thus maintaining fluid circulation through all the beds in the column.

The incoming feed stock in flow conduit 33 mixes with the circulating fluid in downcomer 105 and the combined mixture flows up through funnel-shaped partitioning member 104 wherein contact is made with heat exchange coil 42 which has cooling fluid circulating through it since valve 62 is maintained open. The relatively cool mixture then enters bed 22 and flows through the packed bed. Switch 47 is closed permitting the passage of electric current through the adsorbent which causes the temperature of the solid adsorbent to be maintained relatively higher than the said mixture. By virtue of this temperature gradient in bed 22 the concentration of the liquid in the pores of the solid adsorbent will be enriched in those components which diffuse toward the hot surface. The fluid leaves bed 22 through downcomer 103 and enters bed 21 through partitioning member 102 wherein said fluid contacts heat exchange coil 41 which is operative since valve 61 is open thereby extracting heat from said fluid. Cool fluid enters bed 21 and contacts hot adsorbent and results in further separation. Switch 46 is closed to maintain the flow of electric current in bed 21. Although only two beds are shown in this adsorptive zone, if desirable, more beds may be installed and in fact may be necessary to achieve a desired degree of separation. The fluid leaves bed 21 through flow conduit 27. This fluid is depleted in concentration in those components which diffuse towards a hot surface and the raffinate, which is a portion of said fluid, is withdrawn from downcomer 113 through flow conduit 31. The fluid flows through flow conduit 27, through pump 29, through flow conduit 28, into downcomer 113, and into funnel-shaped partitioning member 112 wherein the fluid contacts operative heat exchange coil 40, valve 60 being open. The fluid then enters bed 26 and contacts the adsorbent in bed 26, switch 51 being open to prevent the passage of electric current in bed 26, thus displacing fluid leaving bed 26 which comprises a fluid the concentration of which is enriched in those components which diffuse toward the hot surface. The fluid leaving bed 26 flows through downcomer 111 through funnel-shaped partitioning member 110 wherein the fluid contacts inoperative heat exchange coil 45, valve 65 being closed and into bed 25. Switch 50 is open thus maintaining the solid adsorbent in bed 25 at substantially the same temperature as the circulating fluid in bed 25. The fluid leaving bed 25 enters downcomer 109 where the adsorbate, which is a portion of said fluid, is withdrawn from column 101 through flow conduit 35. The remaining portion of said fluid flows through funnel-shaped partitioning member 108, wherein the fluid contacts inoperative heat exchange coil 44, valve 64 being closed, and into bed 24. Since the temperature of the circulating fluid and the solid adsorbent are substantially the same in beds 25 and 26, and the liquid in the pores of the solid adsorbent contains a higher concentration of those components which diffuse toward the hot surface, these components will diffuse back into the circulating fluid by virtue of the concentration gradient thereby desorbing the solid adsorbent. The fluid that enters bed 24 comes into contact with relatively hot adsorbent. Switch 49 is closed to maintain the flow of current through bed 24. Fluid leaves bed 24 through downcomer 107 then through funnel-shaped partitioning member 106 wherein the fluid contacts operative heat exchange coil 43, valve 63 being open, and finally flows into bed 23. The relatively cool fluid contacts the relatively hot adsorbent in bed 23 and fluid leaves bed 23 through downcomer 105 where it mixes with incoming feed stock thus completing the cycle. It should be noted that beds 22 and 21 comprise the adsorptive zone, beds 26 and 25 comprise the desorptive zone and beds 24 and 23 comprise the enriching zone. Although FIGURE 2 shows only two beds for each zone, at least two or more beds are required in each zone for efficient separation and the purpose of describing only two beds is for the sake of clarity and brevity.

Simulated countercurrent flow is achieved by periodically advancing downstream the point of introducing the feed stock, simultaneously and equally advancing downstream the point of withdrawing the raffinate and the adsorbate while simultaneously and equally advancing downstream the zone of maintaining the adsorbent temperature relatively higher than the circulating fluid and simultaneously and equally advancing downstream the zone of maintaining the adsorbent temperature substantially the same as the circulating fluid. This concept can be further illustrated by reference to FIGURE 3 which is identical to FIGURE 2 except the rotary valve 30' has rotated such that all the points of introduction and withdrawal of liquid streams and all the zones have been shifted downstream one bed. All beds, switches and lines have the same numbers as in FIGURE 2 except superscripts have been added. It should be noted that the physical location of all the equipment is exactly the same in FIGURE 3 and the shifting of introduction and withdrawal points is accomplished merely by the rotation of rotary valve 30' such that the valve has rotated counterclockwise (as in FIGURE 3) one port and as a result the feed is connected to port 53' instead of port 54, the adsorbate is connected to port 55' instead of port 56 and the raffinate is connected to port 57' instead of port 52. It should also be noted that switch 51' is now closed, switch 50' remains open, switch 49' is now opened and switches 48', 47', and 46' remain closed. Likewise, heat exchange coil 40' remains operative, valve 60' remaining open, coil 45' is now operative, valve 65' having been opened, coils 44' and 43' are inoperative, valves 64' and 63' being closed and coils 42' and 41' remain operative, valves 62' and 61' being open. It would be preferable to synchronize the opening and closing of the switches and the heat exchange coil valves with the rotation of the rotary valve such that when the valve rotates, the proper switches and valves open or close automatically. This can easily be achieved by a suitable programming device which would control said switches and valves and which would be synchronized with the rotation of the rotary valve.

The process of this invention is operated at conditions of temperature, pressure, and under other process conditions which depend upon the particular feed stock involved, the particular adsorbent utilized and the required purity of product. In general, in liquid phase operations the pressure is substantially less than when employing gaseous phase conditions, the latter being dependent upon generally the molecular weight of the feed stock components. Thus the process will be more desirably effected in gaseous phase when the components of the feed stock contain fewer than about 5 carbon atoms per molecule and preferably in liquid phase for compounds of higher molecular weight. Typical liquid phase operations are, for example, temperatures of from 30° F. to 500° F. and pressures of from atmospheric to 30 atmospheres or higher, depending primarily upon the charge stock. Temperature differences between the adsorbent and its surrounding fluid in the adsorption and enriching zones are, for example, from 20° F. to 400° F., depending upon the particular feed stock and the desired product purity. Generally, if other processing conditions are maintained constant, an increase in said temperature differences will result in greater separation.

Suitable feed stocks would include any fluid mixture which contains components that preferentially diffuse towards a hot surface. A particularly suitable feed stock would be an organic liquid containing components which have a high viscosity index relative to other components in the organic liquid. A hydrocarbon liquid mixture would be a preferable feed stock. An example of an especially preferable hydrocarbon liquid mixture would be a lubricating oil having an Engler distillation initial boiling point of approximately 650° F. and an end point of approximately 900° F. Another example of an especially preferable hydrocarbon liquid mixture would be a distillate fuel having an Engler distillation initial boiling point of 400° F. and having an end point of from 450° F. to approximately 700° F. A third example of an especially preferable hydrocarbon liquid mixture would be a gasoline boiling range naphtha that is having an Engler distillation initial boiling point of 140° F. to 200° F. and having an end point up to approximately 400° F.

Another example of a suitable feed stock would be a saturated hydrocarbon mixture such as a paraffin mixture in which the process of this invention is utilized to separate the normal and slightly branched isomeric hydrocarbons from the highly branched isomeric hydrocarbons. Still another preferable feed stock would be a non-aromatic hydrocarbon mixture in which the process of this invention is utilized to separate the paraffin compounds from the naphthenic compounds.

The maximum charge rate of feed stock through the fixed beds of solid adsorbent is limited by the tolerable pressure drop through said fixed beds. The minimum charge rate of feed stock through said fixed beds is limited to a rate sufficient to avoid back mixing (i.e., to maintain substantially plug flow through said beds). These rates will, of course, be dependent upon the type of charge stock used and the conditions of pressure and temperature employed in the process of this invention. It is convenient to use the concept of space velocity in defining the ratio of feed stock charge rate to quantity of adsorbent. The term liquid hourly space velocity will be used herein and is defined as the charge rate of feed stock at conditions of 60° F. and 1 atmosphere in cubic feet per hour divided by the cubic feet of solid adsorbent. It is expected that liquid hourly space velocities from about 0.01 to 1.0 will be employed depending upon the operating conditions of pressure and temperature, the feed stock and the equipment limitations.

This process is especially useful in the production of multi-viscosity lubricating oil. Mineral lubricating oils known as multi-viscosity, multi-grade or double branded lubricating oils are lubricating oils capable of meeting two or more viscosity-grade specifications of the Society of Automotive Engineers (SAE). Such oils are desirable for use as crank case oils when it is necessary to have a lubricant of sufficiently low viscosity at low temperature to permit easy engine starting and of sufficiently high viscosity at higher temperatures to provide satisfactory lubrication at normal engine temperatures.

At the present time, multi-viscosity oils are prepared by adding certain synthetic organic compounds, known as viscosity index improvers, to a lubricating oil of conventional viscosity specifications in an amount sufficient to meet multi-grade specifications. Typical viscosity index improvers are high molecular weight polymers, such as butene polymers, polymers of the esters of methacrylic acid and higher fatty aclohols, alkyl styrene polymers, etc. For conventional multi-grade lubricating oils the viscosity index improvers are added to the oil in amounts up to 8 to 10% by weight of the oil. This adds substantially to the cost of the product. Furthermore, many of the known viscosity index improvers are objectionable because of instability. Oils containing such additives may deteriorate when vigorously agitated or when subjected to high shear rates and stresses, as occurs in lubrication service. Oils containing large concentrations of polymer type viscosity index improvers appeared to behave as non-Newtonian fluids when subjected to high shear rates and tend to approach the viscosity of the original mineral lubricating oil.

This process can successfully produce multi-viscosity lubricating oils without the addition of large amounts of the objectionable synthetic viscosity index improvers. This process is capable of producing lubricating oils with a viscosity index greater than 132 which corresponds to oils of the SAE specification for a 5W/20 or a 10W/20 multi-visocity oil without the addition of the undesirable additives.

Suitable adsorbents might be any substance which can be produced in discrete particles in the size range of from about 10 to about 200 mesh which has an appreciable degree of electrical conductivity and has an appreciable porous structure. Suitable materials are, for example, porous metal particles such as iron, nickel, brass, cobalt, steel, etc. Another type of suitable adsorbent material is electrically conductive graphite.

*Example 1*

The process of this invention is typically illustrated in the following run which comprises a method for separating a mixtures of components present in a lubricating oil into a stream of relatively high viscosity index lubricating oil and a secondary product of lubricating oil having a relatively lower viscosity index. In this example an apparatus comprising a series of 12 vertically positioned interconnected fixed beds is provided, each bed consisting of a section of 2-inch pipe approximately 4 feet in length containing a fixed bed of adsorbent comprising porous iron particles 3.3 feet in length, the inlet at the top and the outlet at the bottom of each of the beds being a 1/16-inch nipple tapped into a 2-inch pipe cap fitted on each end of the 2-inch pipe, the bottom of each bed suspended above the outlet by a glass wool packing. A heat exchange coil is located at the inlet of each bed and the coil is cooled by circulating fluorinated and chlorinated hydrocarbons such as dichlorodifluoromethane through said coil. The bottom of each bed is connected by a 1/16-inch pipe to the top of the next adjacent bed, the line connecting the bottom of the twelfth bed to the top of the first bed containing a liquid pump which delivers liquid to the top of bed 1 at a pressure differential between the twelfth and the first beds of about 50 lbs./in. The porous iron particles and the electrodes are electrically insulated from the pipe wall by a tetrafluoroethylene resin liner. The porous iron particles are of random sizes in which 95% will pass an 8-mesh screen and at least 98% will be retained on a screen of 100-mesh size.

Three feed and withdrawal lines of 1-inch pipe are provided for the process, the three 1-inch lines being manifolds for distribution of the inlet and outlet streams to and from each of the fixed beds of adsorbent. The inlet line into each bed of adsorbent is connected in parallel with three separately valved 1/16-inch lines, each one of the latter three lines being connected to the three manifolds. Thus, each bed may be fed with feed stock or may have withdrawn therefrom separate streams of adsorbate or raffinate. The valves on each of the three lines connecting each bed with each manifold are motor operated by switches activated with a program timing device which opens the feed line to one bed at a time while maintaining the valves to the remaining 11 beds in closed positions, simultaneously maintaining in open position the valve in the line connecting one bed (downstream relative to the bed receiving feed stock) to the raffinate withdrawal manifold and valves to all other beds from the raffinate line closed, simultaneously maintaining in open position the valve connecting one bed (downstream relative to the bed from which raffinate is withdrawn) to the adsorbate withdrawal manifold while maintaining in closed position the valves between all other beds and the adsorbate withdrawal manifold. The program timing device also maintains in a closed position the switches in the adsorption zone such that electric current will flow through those beds, said adsorption zone comprising those beds located between the point of introduction of feed stock and the downstream point of withdrawal of raffinate while simultaneously maintaining in an open position those valves located in the heat exchange coil for those beds in the adsorption zone, simultaneously maintaining in an open position those switches which control the electric current and maintaining in a closed position those valves which control the flow of fluorinated and chlorinated hydrocarbons such as dichlorodifluoromethane to the heat exchange coils to those beds in the desorption zone, said desorption zone comprising those beds located between the point of withdrawal of raffinate and the downstream point of withdrawal of adsorbate and simultaneously maintaining in a closed position those switches which control the electric current and maintaining in an open position those valves which control the flow of fluorinated and chlorinated hydrocarbons such as dichlorodifluoromethane to the heat exchange coils to those beds in the enriching zone, said enriching zone comprising those beds located between the point of withdrawal of adsorbate and the downstream point of introduction of feed stock. The process is operated by charging a solvent extracted lubricating oil refined from a Pennsylvania crude having a viscosity index of 100 at a flow rate of 1.0 gallon/hr. into bed 1 for a period of approximately 9 minutes, simultaneously opening the raffinate valve between beds 4 and 5 for the approximate said 9 minutes, simultaneously opening the adsorbate valve between beds 8 and 9 for the approximate 9 minutes. The valves between all other beds and said manifolds are closed but the lines between adjacent beds are open to the free flow of fluid therebetween. After 9 minutes of such operation the valve operating mechanism which can be set to program a series of operations on 9 minutes or shorter or longer periods of time closes the valve controlling the feed inlet line between the feed stock manifold and bed 1, simultaneously opens the valve in the feed inlet line between the feed stock manifold and the inlet of bed 2, simultaneously closes the raffinate outlet valve in the line connecting the inlet from bed 5 to the raffinate manifold while simultaneously opening the valve in the line connecting the inlet from bed 6 with the raffinate manifold, simultaneously closes the valve in the line connecting the inlet of bed 9 to the adsorbate manifold while simultaneously opening the valve in the line connecting the inlet from bed 10 to the adsorbate manifold. The switches which control the passing of electric current through the beds are closed in beds 1–4 and 9–12 during the first 9-minute period while switches 5–8 are open. Simultaneously, the valves controlling the flow of dichlorodifluoromethane through the heat exchange coils are open in beds 1–4 and 9–12 while the valves for beds 5–8 are closed during said 9-minute period. Simultaneously with switching the feed to bed 2, the switches controlling the passing of electric current through the beds are adjusted such that they are closed in beds 2–5, 10–12 and 1 and are open in beds 6–9 while simultaneously the valves controlling the flow of dichlorodifluoromethane through the heat exchange coils are adjusted such that said valves are open in beds 2–5, 10–12 and 1 and are closed in beds 6–9.

The raffinate stream removed from bed 4 during the 9-minute period after line out at a rate of 0.8 gallon/hr. is composed of a liquid having a viscosity index of approximately 93.5. The adsorbate stream removed from bed 8 during said 9-minute period after line out at a rate of 0.2 gallon/hr. is composed of a liquid having a viscosity index of approximately 125.

*Example II*

The process of this invention is further illustrated employing a feed stock which is a hydrocarbon mixture boiling in the gasoline range, that is, in the range of 180° F. initial boiling point to less than 400° F. end point by an Engler distillation. The F–1 clear octane number of said feed stock is 55.

Employing the same equipment as in Example I, the feed stock is charged to the apparatus at a rate of 1.0 gallon/hr. The raffinate stream removed from the apparatus at a rate of 0.7 gallon/hr. is composed of a liquid having an F–1 clear octane number of 75. The adsorbate stream removed from the apparatus at a rate of 0.3 gallon/hr. is composed of a liquid having an F–1 clear octane number of 8.

I claim as my invention:

1. A process for the adsorptive separation of components of a liquid mixture by thermal diffusion, which comprises supplying said mixture to a porous solid adsorbent which is substantially non-selective for any component of said mixture when both the mixture and the adsorbent are in contact at substantially the same temperature, contacting the liquid mixture with the adsorbent at a substantially different temperature than that of the adsorbent, maintaining the temperature difference between the mixture and the adsorbent during the contacting thereof and thereby concentrating in the intraparticle pores of the adsorbent a first component of said mixture while concentrating a second component of the mixture in the interparticle void space of the adsorbent, withdrawing from the adsorbent a non-adsorbed portion of the liquid mixture while maintaining said temperature difference between the contacting mixture and adsorbent, said non-adsorbed portion being of reduced concentration with respect to said first component, bringing to substantially the same temperature said adsorbent and the liquid in the interparticle void spaces between the particles of the adsorbent, and then withdrawing from the adsorbent a liquid having a higher concentration of said first component than the original feed mixture.

2. The process of claim 1 further characterized in that the solid adsorbent is heated to a relatively higher temperature than the fluid mixture during said contacting step of said process and said adsorbent is cooled to substantially the same temperature as said liquid in the interparticle void spaces between the particles thereof.

3. A continuous process for adsorptive separation of components of a liquid mixture by thermal diffusion, which process comprises introducing the liquid mixture at a relatively low temperature into contact with a solid adsorbent at a higher temperature than said liquid mixture, said adsorbent being substantially non-selective for any component of said mixture when both the mixture and the adsorbent are in contact at substantially the same temperature, thereby retaining an adsorbate of a higher concentration of at least one component of said mixture in the intraparticle pores of the adsorbent, separately withdrawing from the relatively hot adsorbent non-adsorbed raffinate of lower concentration of adsorbed component while maintaining the adsorbent relatively hot and its surrounding liquid relatively cold, adjusting the temperature of the adsorbent and its surrounding liquid to substantially the same temperature and then withdrawing from the adsorbent resulting adsorbate having a higher concentration of adsorbed component.

4. A continuous process for adsorptive separation of components of a liquid mixture by thermal diffusion, which process comprises the steps: introducing feed stock containing a liquid mixture of components into one zone of a series of serially interconnected fixed beds of solid adsorbent, which is substantially non-selective for any component of said mixture when both the mixture and the adsorbent are in contact at substantially the same temperature, said series containing at least 3 serially interconnected zones having fluid flow connecting means between adjacent zones and between the outlet of the last zone and the inlet of the first zone to thereby provide cyclic fluid flow in said process, maintaining the temperature of the adsorbent relatively higher than the flowing fluid in an enriching zone into the downstream point of which the said feed stock is introduced, thereby retaining an adsorbate of a higher concentration of at least one component of the feed stock in the intraparticle pores of the adsorbent, substantially simultaneously withdrawing a non-adsorbed liquid raffinate from the downstream point of an adsorption zone of said series of fixed beds in which the adsorbent temperature is maintained relatively higher than the circulating fluid, substantially simultaneously withdrawing adsorbate from the downstream point of a desorption zone of the series of fixed beds in which the temperatures of the adsorbent and the circulating fluid are substantially the same, maintaining a continuous circulating stream of fluid flowing through said series of interconnected zones, and achieving countercurrency by periodically advancing downstream the point of introducing said feed stock, simultaneously and equally advancing downstream the points of withdrawing non-adsorbed raffinate and adsorbate while simultaneously and equally advancing dowstream the zones of maintaining the adsorbent temperature relatively higher than the circulating liquid and simultaneously and equally advancing downstream the zone of maintaining the adsorbent temperature substantially the same as the circulating liquid.

5. The process of claim 4 further characterized in that the feed stock is a mixture of organic liquids, a component of which has a higher viscosity index relative to another component.

6. The process of claim 4 further characterized in that the feed stock is a mixture of hydrocarbon liquids, a component of which has a higher viscosity index relative to another component.

7. The process of claim 4 further characterized in that the feed stock is a mixture of non-aromatic hydrocarbon liquids, a component of which has a higher viscosity index relative to another component.

8. The process of claim 4 further characterized in that the feed stock is a mixture of paraffin hydrocarbon liquids, a component of which has a higher viscosity index relative to another component.

9. The process of claim 4 further characterized in that the feed stock is a lubricating oil, a component of which has a higher viscosity index relative to another component.

10. The process of claim 4 further characterized in that the feed stock is a hydrocarbon mixture boiling in the distillate fuel range, a component of which has a higher viscosity index relative to another component.

11. The process of claim 4 further characterized in that the feed stock is a hydrocarbon mixture boiling in the gasoline range, a component of which has a higher viscosity index relative to another component and produces a raffinate which has a substantially higher octane number than the feed stock.

12. The process of claim 4 further characterized in that the temperature of the solid adsorbent is maintained relatively higher than the circulating fluid in an enriching zone into the downstream point of which feed stock is introduced, and an adsorption zone into the downstream point of which raffinate is withdrawn, by closing switches in the electric circuits for all the beds in said zones which allows the passage of an electric current through electrically conductive adsorbent between spaced electrodes positioned in the solid adsorbent in each bed of the said zone and simultaneously by contacting the circulating fluid with a heat exchange coil through which a cooling fluid is passed positioned between each bed of the said zones, while in a desorption zone into the downstream point of which adsorbate is withdrawn, the temperature of the adsorbent and the circulating fluid is maintained substantially the same by opening switches in the electric circuits in all those beds within the latter zone preventing electric current from flowing between the electrodes positioned in said beds and closing a valve positioned in each heat exchange coil between those beds in said latter zone preventing the passage of cooling fluid through said heat exchange coils said switches and valves synchronized with the advancement of the point of introducing feed and withdrawing raffinate and adsorbate in such a manner that when the feed introduction point is advanced downstream one bed, the adsorption zone is advanced downstream one bed, the desorption zone is advanced downstream one bed and the enriching zone is advanced dowstream one bed which results in closing the switch and opening the valve for the bed into which the adsorption zone has advanced and simultaneously opening the switch and closing the valve for the bed into which the desorption zone has advanced.

13. The process of claim 12 further characterized in that said solid adsorbent comprises porous electrically conductive metal particles of from about 10 to about 200 mesh in size.

14. The process of claim 12 further characterized in that said solid adsorbent comprises porous electrically conductive carbon particles of from about 10 to about 200 mesh in size.

15. The process of claim 12 further characterized in that the temperature gradient imposed between the adsorbent and the circulating fluid will be within the range of from about 20° F. to about 400° F.

16. The process of claim 12 further characterized in that the liquid hourly space velocity of the feed stock charge rate relative to the volume of adsorbent will be within the range of from about 0.01 to about 1.0.

References Cited by the Examiner

UNITED STATES PATENTS

| | | | |
|---|---|---|---|
| 1,023,783 | 4/1912 | Knapp | 260—679 |
| 1,238,339 | 10/1917 | Robertson | 208—106 |
| 2,603,587 | 7/1952 | Simms | 208—310 |
| 2,631,727 | 3/1953 | Cichelli | 208—310 |
| 2,696,305 | 12/1954 | Slover | 208—310 |
| 2,764,620 | 9/1956 | Findlay | 208—310 |
| 3,193,582 | 7/1965 | Adans et al. | 208—310 |

ALPHONSO D. SULLIVAN, *Primary Examiner.*